INVENTOR.
Hyland C. Flint
BY
Barnard, McGlynn & Reising
ATTORNEYS

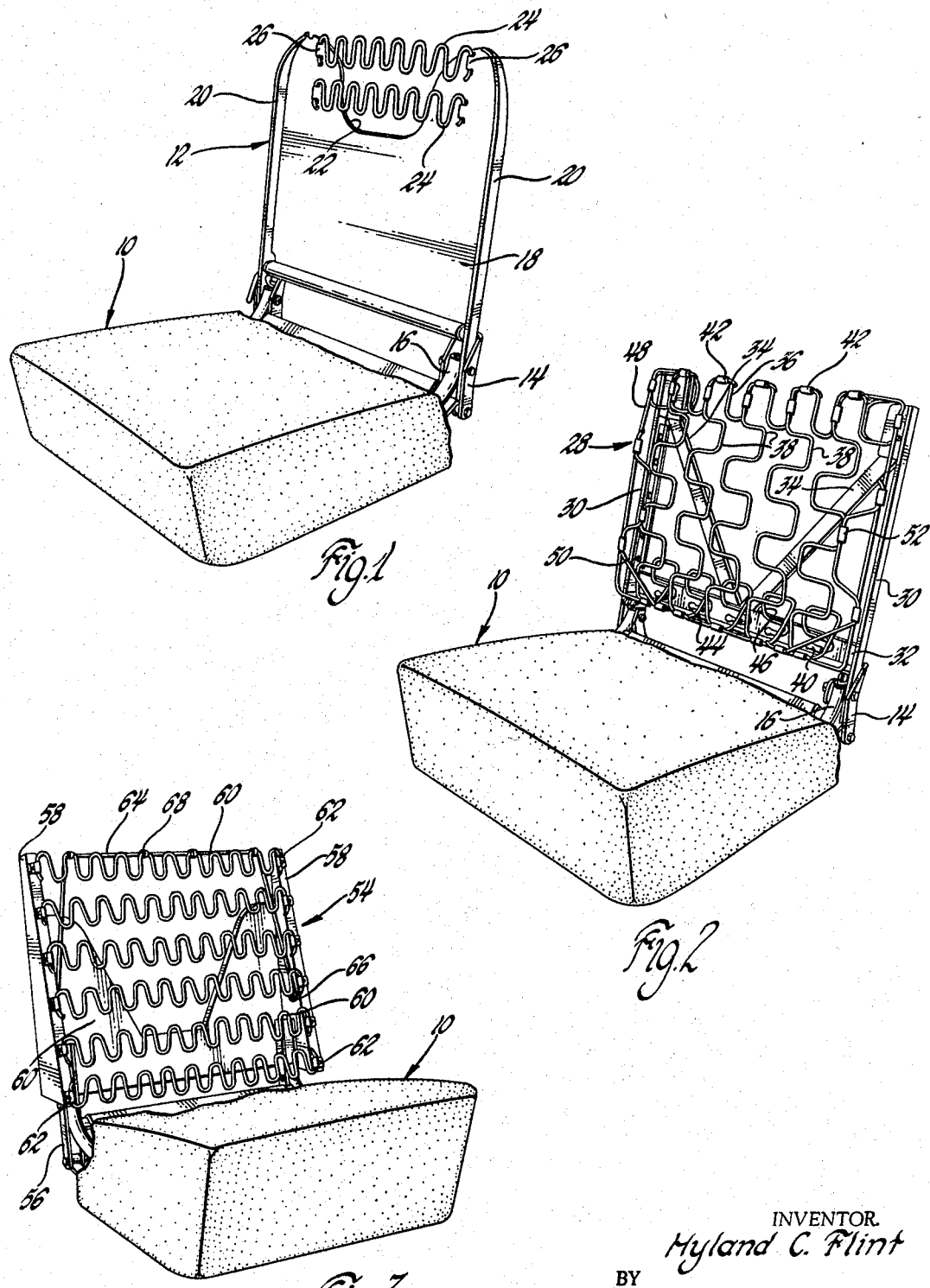

United States Patent Office 3,328,020
Patented June 27, 1967

3,328,020
SEAT STRUCTURE
Hyland C. Flint, 3551 Walnut Lake Road,
Orchard Lake, Mich. 48033
Filed Mar. 31, 1966, Ser. No. 539,118
11 Claims. (Cl. 267—102)

This invention relates to seat structures, and more particularly to a backrest member extending upwardly from a seat portion, the back member having a resilient upper edge.

In the manufacture and production of seat assemblies, where a seat member supports an occupant and a backrest member provides a means against which the occupant may rest for support and comfort, it is often desirable to provide a backrest structure which has a maximum degree of resilience for comfort, and yet provides the degree of support necessary to maintain the occupant in a desired position. In some installations such as those in motor vehicles or the like, a backrest member must be of sufficient stiffness to maintain the occupant in an alert and untiring position for the operation of the vehicle. Each portion of the backrest member must be properly designed and manufactured for maximum support, depending upon the portion of the back of the occupant that is to be supported.

One portion of the usual backrest member that has received little attention in the past has been the upper edge that normally provides little support to the back because of the anatomy of the occupant. When in a seated position, or in a vehicle operating position, the upper edge of the backrest member is normally spaced rearwardly of the occupant, and thus has not been considered to be too much more than a means by which the upholstery and trim material may be supported. However, it is becoming increasingly apparent that this portion of the seat back, particularly when the seat is used in a motor vehicle installation, can cause a serious safety problem for occupants of the vehicle. Upon an impact or sudden stop, an occupant sitting behind the front seat may be thrown forwardly against such seat structure and the occupant of the seat when thrown rearwardly, may be injured by the back structure.

It has been common, in the past, to provide seat backrest members with relatively rigid upper edges, such edges being thought to be necessary for upholstery and trim support and to provide the desired shape and styling to the seat construction. It is the usual practice to provide a perimeter border frame around a backrest structure, the border frame supporting springs or other resilient means within the backrest member for the resilient support needed by the occupant. It is the rigid upper member of such frame that is most liable to cause injury to the occupant of the seat, or to someone sitting behind the seat assembly.

It is here proposed to provide a seat backrest structure having a resilient upper edge to alleviate the safety problems attendant in the normal seating installations. A seat back structure is provided which in skeleton or frame form is open at the upper edge, and has spring members extending across the opening to provide the necessary resilient support at the upper edge of the back member. Such resilient means permits a desired amount of give when engaged from either the front or the rear of the seat member, and at the same time serves as sufficient upholstery and trim support to permit the desired styling of the seat assembly. By providing such resilient means, it is apparent that the occupant may move the upper portion of the back member rearwardly, and it is also apparent that a person behind the seat installation may move the upper edge of the back member forwardly, avoiding any serious injury under impacts and the like. Such construction is easily manufactured and produced and permits a wide variety of trim and upholstery design without hampering the resilient support required for the back of the user, and without destroying the structural strength of the back assembly.

These and other advantages will become more apparent from the following description and drawings in which:

FIGURE 1 is a perspective view, with parts broken away, illustrating a typical seat assembly and showing resilient means across the upper edge of the back member.

FIGURE 2 is a perspective view, with parts broken away, of another typical seat assembly showing the resilient means across the upper edge.

FIGURE 3 is a perspective view of yet another typical seat assembly showing the resilient means across the upper edge.

Figure 4:
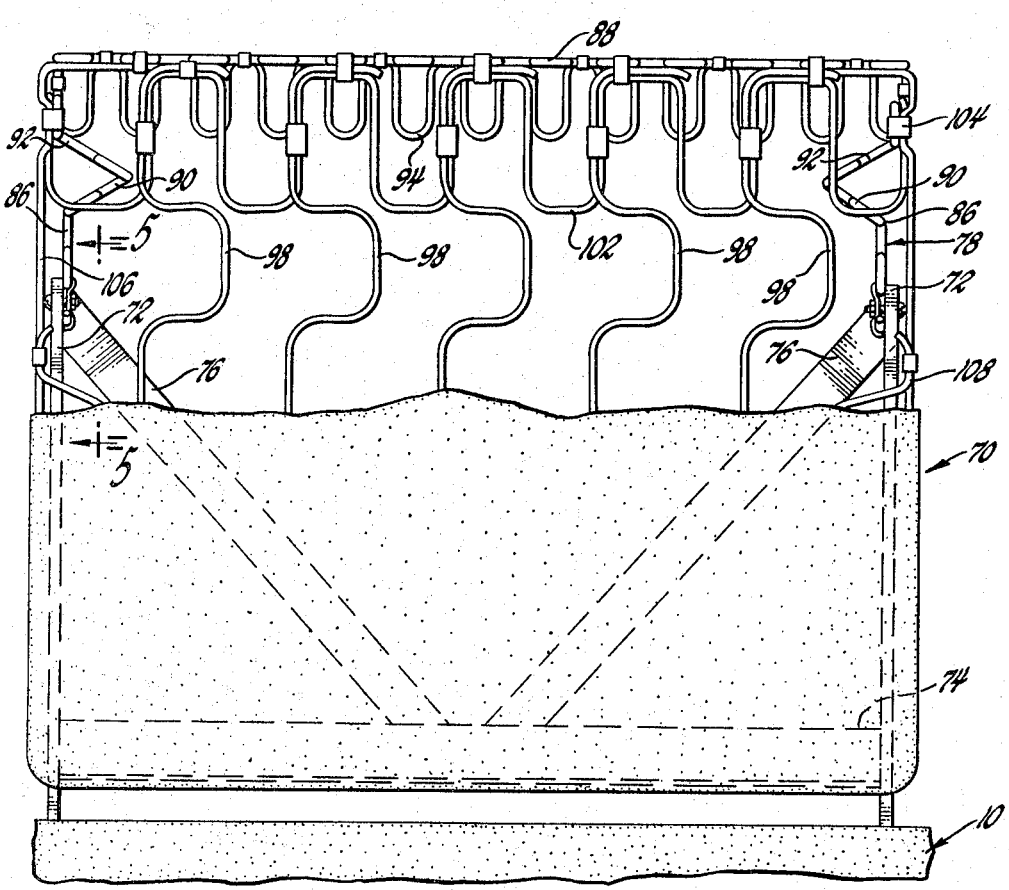
FIGURE 4 is an elevational view of still another seat assembly, with parts broken away and in sections, showing the location of the various parts of the seat back structure.

Referring more particularly to the drawings, FIGURES 1 through 3 illustrate several seat assembly modifications in which a back member is provided with a resilient upper edge. In FIGURE 1, a seat assembly, illustrated generally by the numeral 10, is provided with the usual resilient support means, not shown, to support the occupant in the conventional manner. Secured to the seat assembly 10 and extending upwardly from the rear thereof is a back assembly 10 and extending upwardly from the rear thereof is a back assembly, indicated generally by the numeral 12. Back assembly 12 may be secured to the seat structure in any suitable manner, such as by channel members 14 secured to seat frame members 16 and in which are pivotally mounted the back structure 12. Such pivotal mounting permits the back structure to be pivoted forwardly over the seat structure 10, should the installation be in a motor vehicle or the like in which space limitations require such pivotal movement. The back structure 12 is shown to include a pan 18, having forwardly directed side flanges 20 for purposes of strength and design. Pan 18 serves as a convenient mounting surface for resilient springs or for a large block of foam material to provide the usual support for the back of the occupant of the seat structure. At the upper edge of pan 18 is a cut out portion 22, extending downwardly into the pan 18 and providing an open space between the upper corners of the pan 18. Extending across the open space are a pair of sinuous spring wire members 24, secured in the pan 18 by tabs 26 lanced out of and bent out of the plane of the pan 18 and around the end loops of the spring strips 24. The upper spring strip extends across the upper edge of the back structure 12 and it will be apparent that upholstery and trim mounted on back structure 12 may be conveniently supported on or around the spring strip 12. It will also be apparent that the resilient strips 24 may be deflected, either forwardly or rearwardly, out of the general plane of the pan 18 for the comfort of the occupant, or for safety in case of impact by the occupant or someone else seated rearwardly of the seat structure.

FIGURE 2 illustrates another embodiment of the backrest structure which is secured to a seat assembly 10 in generally the same manner, the backrest structure, indicated generally by the numeral 28, being pivotally mounted in the channel members 14, secured to seat frame members 16. Backrest assembly 28 includes side frame channels 30 extending upwardly from the seat structure 10, and a cross channel 32 secured to the upright members 30 at the lower ends thereof. In order to support the upright member 30, a pair of diagonal brace members 34 extend from the cross member 32 to the upper portions of the side elements 30 and are secured thereto in any suitable manner.

Secured across the top of the back structure 28 and between the side frame elements 30, is a sinuous spring strip 36 forming the upper member of the seat frame. Spring strip 36 is secured in the side frame members 30 in any suitable manner, and it is apparent that such spring strip may be deflected forwardly or rearwardly out of the general plane of the back structure 30.

In order to support the back of the occupant of the seat assembly illustrated in FIGURE 2, a plurality of vertically extending sinuous spring strips 38 are secured at their lower ends in tabs 40 formed out of the lower cross member 32. At the upper ends, spring strips 38 are secured by clips 42 to the transversely extending spring strip 36. The lower ends of the spring strips 38 may be bent inwardly and upwardly as at 44, and then inwardly and downwardly as at 46 to provide V-support at the lower ends thereof. Extending around the perimeter of the seat back structure 28 is a border wire 48, having border wire support elements 50 secured to the vertically extending springs 38 by suitable clips 52. Border wire 48 supports the upholstery and trim and provides the proper design of the seat back assembly in the trimmed upholstered form.

Referring next to FIGURE 3, yet another embodiment of the structure is shown in which a seat element, illustrated generally by the numeral 10, has extending upwardly therefrom the back assembly, illustrated generally by the numeral 54. Back assembly 54 is secured and pivotally mounted on the seat structure 10 by the channel members 56 as above described.

Frame elements 58 at either side of the back structure 54 are secured to a flat plate 60 which extends partially along the side members 58 and which is open at the upper portion thereof. A plurality of sinuous spring strips 60 extend between the side frame members 58 and are secured thereto in any suitable manner, as by clips 62. The sinuous spring strips 60 provide the necessary resilient support for the back of the occupant of the seat structure, and the upper spring strip extends across the opening between the side frame members 28. The upper spring strip is deflectable forwardly or rearwardly of the general plane of the back assembly 54 to provide the resilient upper edge for the back structure.

In order to provide trim and upholstery support means, an upper border wire 64, of generally U-shape, is secured to the side frame members 58 as at 66 and is secured to the upper spring member 60 by means of suitable clips 68. Border wire 64 provides little, if any, resilient support to the back structure but does provide a means by which the upholstery and trim material may be conveniently secured over the top of the back structure 54.

Figure 6:
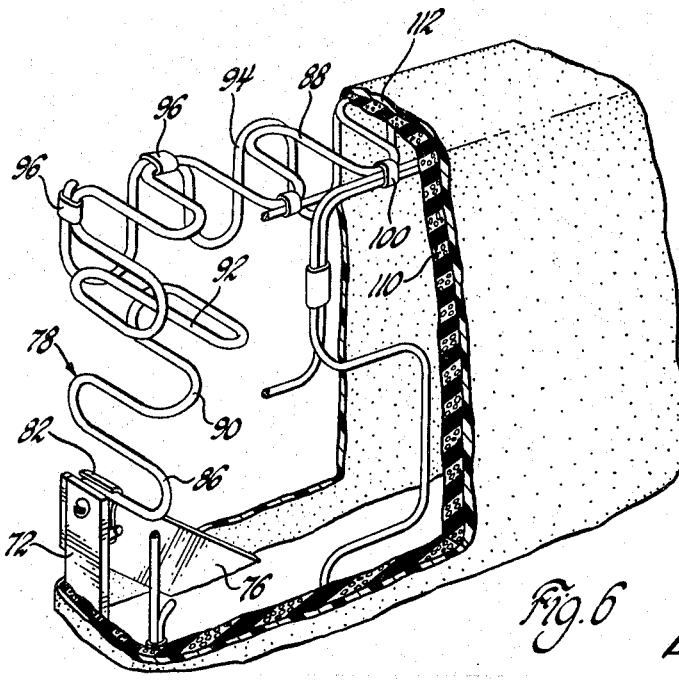
FIGURE 6 is a perspective view of a portion of the structure illustrated in FIGURE 4, with parts broken away and in section, to illustrate the position of the various parts.
Figure 5:
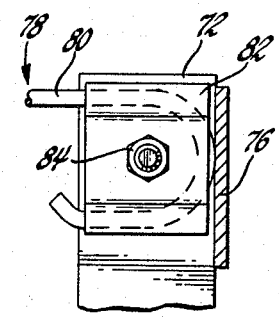
FIGURE 5 is an enlarged view of a portion of the structure illustrated in FIGURE 4, taken substantially along the line 5—5 of FIGURE 4 and looking in the direction of the arrows, to illustrate the manner in which the resilient means at the upper edge of the back structure is mounted.

Referring next to FIGURES 4 through 6, yet another embodiment of the back assembly is shown. The seat structure, illustrated generally by the numeral 10, supports the back assembly, illustrated generally by the numeral 70, which extends rearwardly of and upwardly from the seat structure 10. Back assembly 70 includes side frame members 72 which are separated at their base by a cross member, indicated by dashed lines 74, the side frame member 72 extending only partially along the entire height of the back assembly 70. Diagonal supporting braces 76 provides the necessary strength for the side frame members 72, braces 76 being secured in any suitable manner to the side frame element 72 and the cross member 74.

Secured adjacent the upper end of the side frame member 72 is a generally U-shaped sinuous spring strip, indicated generally by the numeral 78. Spring strip 78 is secured to the side frame members in a manner such as illustrated in FIGURE 5, wherein the end loop 80 of the spring strip 78 is secured to the side frame member 72 by means of a clip 82 clamping the loop 80 against the member 72 and held in place by a nut and bolt assembly 84. Sinuous spring strip 78 includes leg portions 86 extending upwardly from the side frame members 72, and a cross portion 88 extending across the top of the back structure 70. Leg portions 86 are each provided with a fish-mouth portion, wherein the leg portions are bent first inwardly, as at 90, and then outwardly, as at 92, to provide vertical resilience for the U-shaped spring member 78 above the frame side members 72. The overall U-shaped construction of the spring wire member 78 also permits forward and rearward deflection and thus provides the resilience desired at the upper edge of the seat structure. At the same time, the vertical resilience offered by the fish-mouth sections of the legs 86 avoids any problem where an occupant might strike the corners of the back member 70 and contact the upper ends of side frame members.

Although the cross portion 88 is shown to be in a horizontal plane above the seat back, the cross member may instead be bent to lie in a vertical plane, should such be desired. The vertical and horizontal resilience are the properties looked for, and any configuration that provides these features is sufficient.

Should further strength be needed at the upper edge of the seat back assembly 70, yet another sinuous spring wire strip 94 may be provided to extend across the back of the cross member 88 of the wire strip 78. Such spring wire 94 may be secured to the spring member 78 by means of suitable clips, such as clips 96. At the same time, the spring wire 94 may aid in obtaining the desired trim design for the seat back structure 70.

In order to provide the resilient support for the back of the occupant, a plurality of vertically extending spring wire members 98 may be provided. The spring wire members 98 are suitably secured at their lower ends in the seat back structure 70, and are clipped at their upper end as by clips 100, to the cross member 88 of the spring wire U-shaped member 78. For further upholstery support, a forward spring wire member 102 may extend across the U-shaped spring wire 78, being secured to the legs 86 thereof by clips 104, or the like, and a border wire 106 with suitable tie wires 108 clipped between the border wire 106 and the outer vertical spring member 98 may be provided. Mounted on this spring structure is the upholstery padding 110 and the outer trim cover 112 of any suitable fabric, or the like.

Thus, a back support structure is provided for a seat installation in which the upper edge thereof has a degree of resilience permitting deflection out of the general plane of the back structure for both the comport of the occupant of the seat assembly and for purposes of safety in avoiding injuries due to contact with the upper edge of the back support structure, particularly where, the seat installation is in a motor vehicle or other moving conveyance. Such resilient back edge can be provided without destroying the versatility of design and aesthetics in the upholstery and trim of the seat structure, nor is it detrimental to the required strength or support in the seat back installation.

Changes and modifications to the structure will occur to those having skill in the art, after having had reference to the foregoing description and drawings. However, it is not intended to limit the scope of the foregoing description and drawings but by the scope of the appended claims in which:

The embodiments of the invention in which an exclusive property or privilege is claimed are defined as follows:

1. A seat back structure comprising:
a frame structure having side elements;

resilient means rigidly secured to and being upward extensions of said side elements;

and a spring wire member extending between said resilient means and being attached thereto to form a deflectable upper edge for said seat back structure.

2. The seat back structure set forth in claim 1 wherein said resilient means and said spring wire member are formed of a single sinuous spring wire strip formed in U-shape, the ends of the leg portions of said wire strip being secured to said side elements of said frame structure, and the planes of said strip being generally normal to the plane of said back structure.

3. The seat back structure set forth in claim 2 wherein the leg portions of said U-shaped strip between said side elements and said spring wire member are bent first inwardly and then outwardly to form V supporting portions.

4. The seat back structure set forth in claim 3 and further including a plurality of spring wire elements extending between portions of said seat back structure to provide resilient support.

5. The seat back structure set forth in claim 4 wherein said spring wire elements extend from the top of said seat back structure to the bottom thereof, said elements being secured at the upper ends thereof to said spring wire member.

6. The seat back structure set forth in claim 5 and further including a border wire extending at least partially around said seat back structure to support upholstery means.

7. A seat back structure comprising:
a frame structure having side elements extending upwardly and terminating below the upper limit of said back structure;

and a U-shaped spring wire member having the ends of the leg portions thereof rigidly secured to said upwardly extending side elements and extending upwardly therefrom to form upward extensions thereof, said leg portions being resilient in the plane of said back structure and the cross portion of said spring wire member being deflectable in a plane normal to said back structure to provide a deflectable top for said seat structure.

8. The seat back structure set forth in claim 7 wherein the leg portions of said spring member are bent first inwardly and then outwardly above said side elements.

9. The seat back structure set forth in claim 8 wherein said spring wire member is formed of a sinuous spring wire strip.

10. The seat back structure set forth in claim 9 and further including spring wire elements extending between said frame structure and the cross portion of said spring wire member.

11. The seat back structure set forth in claim 9 and further including a sinuous spring wire element extending between said leg portions of said U-shaped spring wire member and being secured thereto.

References Cited

UNITED STATES PATENTS

| 2,127,337 | 8/1938 | Lotz | 267—103 |
| 3,095,189 | 6/1963 | Slomirski | 267—102 |
| 3,189,386 | 6/1965 | Gescheidle et al. | 297—455 |
| 3,190,636 | 6/1965 | Ward et al. | 267—107 |
| 3,206,250 | 9/1965 | Komenda | 297—456 |

FOREIGN PATENTS

| 1,024,815 | 2/1958 | Germany. |

CASMIR A. NUNBERG, *Primary Examiner.*